United States Patent
Morimoto et al.

(10) Patent No.: US 9,008,060 B2
(45) Date of Patent: Apr. 14, 2015

(54) MOBILE TERMINAL APPARATUS, RADIO BASE STATION APPARATUS AND RADIO COMMUNICATION METHOD

(75) Inventors: Akihito Morimoto, Tokyo (JP); Mamoru Sawahashi, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 340 days.

(21) Appl. No.: 13/519,157

(22) PCT Filed: Jan. 5, 2011

(86) PCT No.: PCT/JP2011/050039
§ 371 (c)(1),
(2), (4) Date: Jul. 2, 2012

(87) PCT Pub. No.: WO2011/083797
PCT Pub. Date: Jul. 14, 2011

(65) Prior Publication Data
US 2012/0263068 A1    Oct. 18, 2012

(30) Foreign Application Priority Data
Jan. 7, 2010   (JP) .................................. 2010-002240

(51) Int. Cl.
*H04W 52/24* (2009.01)
*H04W 24/10* (2009.01)
(Continued)

(52) U.S. Cl.
CPC ............. *H04W 24/10* (2013.01); *H04L 5/0007* (2013.01); *H04L 5/006* (2013.01); *H04W 52/143* (2013.01);
(Continued)

(58) Field of Classification Search
CPC ................. H04W 52/04–52/60; H04B 7/024; H04B 7/0417; H04B 7/0421; H04B 7/0619–7/0634
USPC .................................................. 370/328–338
See application file for complete search history.

(56) References Cited

U.S. PATENT DOCUMENTS

| 2010/0027456 A1* | 2/2010 | Onggosanusi et al. | 370/312 |
| 2011/0075611 A1* | 3/2011 | Choi | 370/329 |
| 2012/0176982 A1* | 7/2012 | Zirwas et al. | 370/329 |

FOREIGN PATENT DOCUMENTS

| JP | 2001-244878 A | 9/2001 |
| JP | 2003-152640 A | 5/2003 |

(Continued)

OTHER PUBLICATIONS

3GPP TR 25.912 V7.1.0, Sep. 2006, "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)," 57 pages.
Translation of International Search Report issued in PCT/JP2011/050039, mailed on Feb. 1, 2011, 2 pages.
Notification of Reasons for Rejection for Japanese Application No. 2010-002240 dated Sep. 11, 2012, with English translation thereof (8 pages).

*Primary Examiner* — Pao Sinkantarakorn
(74) *Attorney, Agent, or Firm* — Osha Liang LLP

(57) ABSTRACT

A mobile terminal apparatus, a radio base station apparatus and a radio communication method are provided which can perform optimum control during downlink CoMP transmission in an LTE-A system. The radio communication method according to the present invention includes steps of the mobile terminal apparatus receiving downlink signals including reference signals from a plurality of radio base station apparatuses associated with downlink CoMP, transmitting feedback information including the channel quality measurement results to the plurality of radio base station apparatuses, and steps of a radio base station apparatus receiving uplink signals including channel quality measurement results of a plurality of radio base station apparatuses associated with downlink CoMP and cell information on radio base station apparatuses whose average reception levels are within a first threshold range, and controlling, when there are radio base station apparatuses whose average reception level difference is within a second threshold range among radio base station apparatuses whose average reception levels are within the first threshold range, transmission power for both radio base station apparatuses.

15 Claims, 8 Drawing Sheets

(51) Int. Cl.
  *H04W 52/14* (2009.01)
  *H04W 52/40* (2009.01)
  *H04B 7/02* (2006.01)
  *H04B 7/06* (2006.01)
  *H04L 5/00* (2006.01)

(52) U.S. Cl.
  CPC ............ *H04W 52/247* (2013.01); *H04W 52/40* (2013.01); *H04B 7/024* (2013.01); *H04B 7/0632* (2013.01); *H04W 52/245* (2013.01)

(56) References Cited

FOREIGN PATENT DOCUMENTS

| | | |
|---|---|---|
| JP | 2003-234697 A | 8/2003 |
| JP | 2004-007279 A | 1/2004 |
| JP | 2009-005057 A | 1/2009 |
| JP | 2009-206735 A | 9/2009 |

* cited by examiner

US 9,008,060 B2

MOBILE TERMINAL APPARATUS, RADIO BASE STATION APPARATUS AND RADIO COMMUNICATION METHOD

TECHNICAL FIELD

The present invention relates to a mobile terminal apparatus, a radio base station apparatus and a radio communication method that relate to downlink CoMP transmission (Coordinated Multiple Point transmission).

BACKGROUND ART

LTE (Long Term Evolution) systems (Non-Patent Literature 1) defined in 3GPP (3rd Generation Partnership Project) adopt OFDMA (Orthogonal Frequency Division Multiple Access) on downlinks. Thus, certain frequency and time radio resources are basically allocated to one mobile terminal apparatus (UE: User Equipment) through scheduling by a radio base station apparatus, and therefore users in the same cell are orthogonal to each other in frequency and time domains. However, since LTE systems are based on one-cell frequency reuse, a large amount of interference occurs from peripheral cells and the interference level at a UE located at cell edge is particularly high. Therefore, countermeasures for inter-cell interference are required to compensate for peripheral cell interference and maintain certain receiving quality.

3GPP is studying LTE-A (LTE-Advanced) systems to realize high-speed transmission with wider coverage than that of LTE systems. The LTE-A (LTE-Advanced) systems adopt coordinated multipoint transmission/reception (CoMP) as additional countermeasures for inter-cell interference. According to this CoMP, data and reference signals (RS) are simultaneously transmitted to mobile terminal apparatus 1 from radio base station apparatus 2A of the own cell (cell A) (Serving cell) and radio base station apparatus 2B of a peripheral cell (cell B) on downlinks as shown in FIG. 1. In this case, a control channel signal (PDCCH signal) is transmitted only from radio base station apparatus 2A of cell A, which is a serving cell.

CITATION LIST

Non-Patent Literature

[Non-Patent Literature 1] 3GPP, TR25.912 (V7.1.0), "Feasibility study for Evolved UTRA and UTRAN", September 2006

SUMMARY OF INVENTION

Technical Problem

In downlink CoMP, when signals are transmitted from two radio base station apparatuses 2A and 2B, average reception levels of the signals received by the mobile terminal apparatus 1 are different as shown in FIG. 2, that is, average reception levels of signals transmitted from radio base station apparatuses 2A and 2B are not equal, which results in nonuniform gain diversity reception and the diversity gain decreases. For this reason, even when simultaneous transmission on downlinks among a plurality of cells is applied, only a small improvement can be achieved in receiving quality of a mobile terminal apparatus at a cell edge.

Furthermore, radio interfaces of the LTE systems do not define that a mobile terminal apparatus should simultaneously receive signals from a plurality of radio base station apparatuses. Furthermore, the LTE systems define that feedback information such as channel quality information (CQI) should be fed back to only one radio base station apparatus. Assuming a mobile terminal apparatus applies CoMP in such an LTE system, for example, CQIs measured based on reference signals from the respective radio base station apparatuses are CoMP-combined and the combined CQI is fed back. For this reason, in the case of downlink CoMP transmission, channel quality information between the mobile terminal apparatus and each radio base station apparatus cannot be fed back and optimum control cannot be performed in CoMP transmission.

The present invention has been implemented in view of the above problems and it is an object of the present invention to provide a mobile terminal apparatus, a radio base station apparatus and a radio communication method that can perform optimum control when performing downlink CoMP transmission in an LTE-A system.

Solution to Problem

A mobile terminal apparatus of the present invention includes a receiving section configured to receive downlink signals including reference signals from a plurality of radio base station apparatuses associated with downlink multipoint transmission, a channel quality measuring section configured to measure channel qualities using the reference signals and a transmitting section configured to transmit feedback information including the channel quality measurement results to the plurality of radio base station apparatuses.

A radio base station apparatus of the present invention includes a receiving section configured to receive uplink signals including channel quality measurement results of a plurality of radio base station apparatuses associated with downlink multipoint transmission and cell information on radio base station apparatuses whose average reception levels are within a first threshold range, a determining section configured to determine whether or not there are radio base station apparatuses whose average reception level difference is within a second threshold range among radio base station apparatuses whose average reception levels are within the first threshold range from the channel quality measurement results and the cell information, and a transmission power control section configured to control, when there are radio base station apparatuses whose average reception level difference is within the second threshold range, transmission power for both radio base station apparatuses.

A radio communication method of the present invention includes steps of a mobile terminal apparatus receiving downlink signals including reference signals from a plurality of radio base station apparatuses associated with downlink multipoint transmission, measuring channel qualities using the reference signals, transmitting feedback information including the channel quality measurement results to the plurality of radio base station apparatuses, and steps of a radio base station apparatus receiving uplink signals including channel quality measurement results of a plurality of radio base station apparatuses associated with downlink multipoint transmission and cell information on radio base station apparatuses whose average reception levels are within a first threshold range, determining whether or not there are radio base station apparatuses whose average reception level difference is within a second threshold range among radio base station apparatuses whose average reception levels are within the first threshold range from the channel quality measurement results and the cell information, and controlling, when there are radio base station apparatuses whose average reception level difference is within the second threshold range, transmission power for both radio base station apparatuses.

Advantageous Effects of Invention

The present invent ion measures channel quality using reference signals from a plurality of radio base station apparatuses, transmits feedback information including the respective channel quality measurement results to a plurality of radio base station apparatuses, and can thereby perform optimum control when performing downlink CoMP transmission in an LTE-A system.

DESCRIPTION OF EMBODIMENTS

Hereinafter, an embodiment of the present invention will be described in detail with reference to the accompanying drawings.

As described above, the radio interface of an LTE system does not define that a mobile terminal apparatus should simultaneously receive signals from a plurality of radio base station apparatuses. Furthermore, the LTE system defines that feedback information such as one piece of channel quality information (CQI) is fed back in response to a reference signal transmitted on a downlink. Therefore, if a mobile terminal apparatus applies CoMP in such an LTE system, it is possible to feed back only CoMP-combined CQI when feeding back CQI measured based on reference signals, and careful control is not possible.

Thus, the present inventor et al. proposed a radio interface that respectively feeds back channel quality information to a plurality of radio base station apparatuses when performing CoMP transmission, and thereby made possible optimum control when performing CoMP transmission.

The following four methods are cited as methods of respectively feeding back channel quality information (feedback information) to a plurality of radio base station apparatuses when performing CoMP transmission.
(1) Method of Transmitting Channel Quality Information to a Plurality of Radio Base Station Apparatuses for Every Subframe on a Time-Division System Using Uplink Control Channel (PUCCH)

Figure 1:
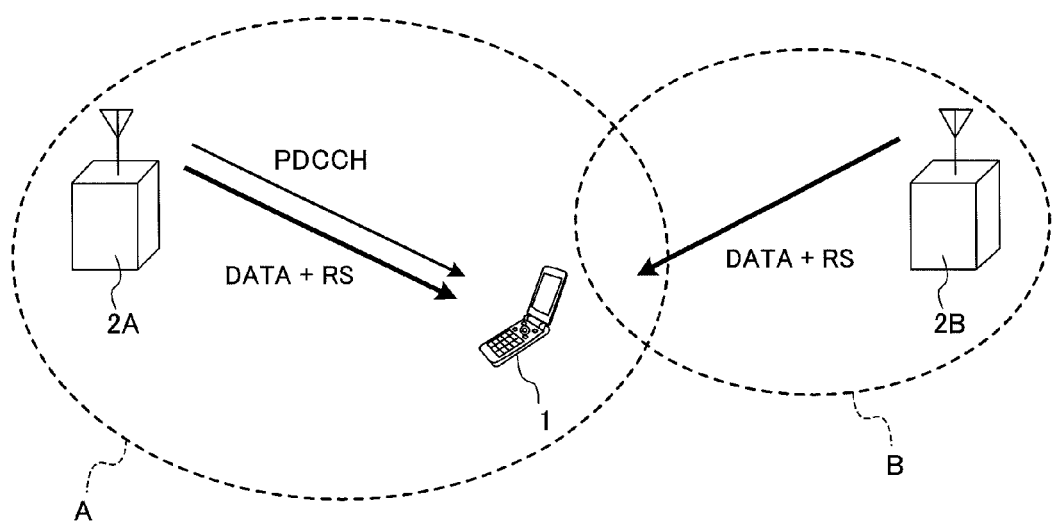
FIG. 1 is a diagram illustrating downlink CoMP.
Figure 2:
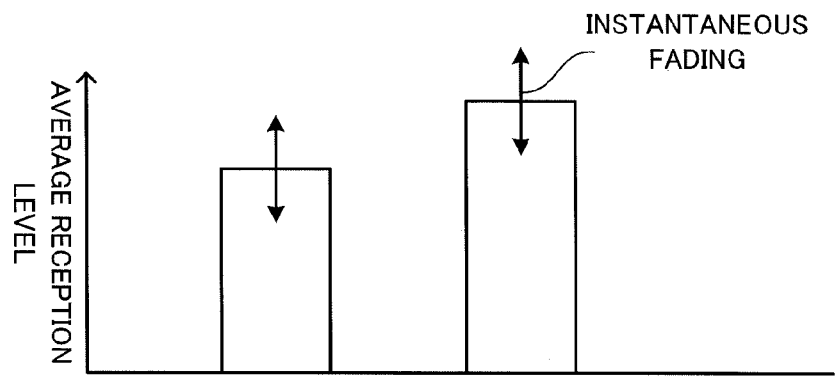
FIG. 2 is a diagram illustrating an average reception level in downlink CoMP.

In this case, for example, a CQI of cell A, a CQI of cell B and a combined CQI in FIG. 1 are transmitted temporally continuously. Alternatively, the CQI of cell A and the CQI of cell B are transmitted temporally continuously. In this case, the frequency with which channel quality information is transmitted to one radio base station apparatus decreases and trackability with respect to a time variation deteriorates, but since it is an object to equalize average reception levels among radio base station apparatuses and increase a diversity effect, a small frequency with which channel quality information is transmitted is considered not problematic. Here, the average reception level refers to an average value of reception level over a certain period.
(2) Method of Transmitting Channel Quality Information to a Plurality of Radio Base Station Apparatuses Using Uplink Shared Channel (PUSCH)

The frequency with which channel quality information is transmitted to one radio base station apparatus in this case also decreases and trackability with respect to a time variation deteriorates, but since it is an object to equalize average reception levels among radio base station apparatuses and increase a diversity effect, a small frequency with which channel quality information is transmitted is considered not problematic.
(3) Method of Transmitting Code-Multiplexed Channel Quality Information to a Plurality of Radio Base Station Apparatuses For example, different cyclic shifts are added using a cyclic shift method and respective pieces of channel quality information are orthogonalized. In this case, cyclic shift numbers are reported from the radio base station apparatus as control information.
(4) Method of Transmitting Channel Quality Information to a Plurality of Radio Base Station Apparatuses from a Plurality of Transmitting Antennas Using MIMO (Multiple Input Multiple Output) Transmission.

As described above, channel quality information (feedback information) is respectively fed back from a mobile terminal apparatus to a plurality of radio base station apparatuses. The radio base station apparatuses control transmission power of downlink transmission using the channel quality information or the like fed back in this way so that average reception levels of signals from radio base station apparatuses associated with CoMP transmission (radio base station apparatus in CoMP candidate cells) are equal at the mobile terminal apparatus (method 1).

Figure 3:
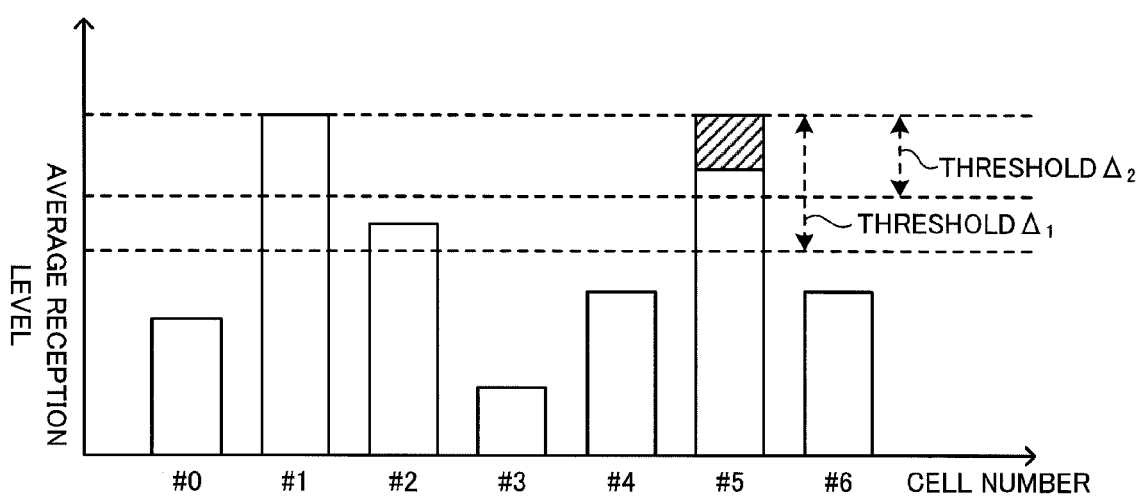
FIG. 3 is a diagram illustrating transmission power control according to an embodiment of the present invention.

Method 1 will be described using FIG. 3. Suppose average reception levels of signals from radio base station apparatuses in respective cells at the mobile terminal apparatus are as shown in FIG. 3. In this case, an average reception level of each cell is determined against a threshold to determine whether or not there is a cell whose average reception level is within a threshold $\Delta_1$ first. When there is a cell whose average reception level is within the threshold $\Delta_1$, information indicating which cell corresponds to such a cell (cell information) is fed back to the radio base station apparatus. Here, since the average reception levels of cell #1, cell #2 and cell #5 are within the threshold $\Delta_1$, information on cell #1, cell #2 and cell #5 is fed back to the radio base station apparatus.

When there is a cell whose average reception level is within the threshold $\Delta_1$ (first threshold), the radio base station apparatus determines that the mobile terminal apparatus is located at the cell edge. A procedure up to this determination is the same as that for handover. Next, the radio base station apparatus determines whether or not the average reception level difference is within a threshold $\Delta_2$ (second threshold). When the average reception level difference is within the threshold $\Delta_2$ the radio base station apparatus controls transmission power so that both average reception levels become equal (joint transmission with matching average reception levels). Here, since the difference (shaded area) between the average reception level of cell #1 (average reception level of a signal from the radio base station apparatus of cell #1) and the average reception level of cell #5 is within the threshold $\Delta_2$, the radio base station apparatus controls transmission power of a transmission signal from the radio base station apparatus of cell #1 and/or transmission power of a transmission signal from the radio base station apparatus of cell #5 so that both average reception levels become equal.

As a way of controlling transmission power, total transmission power of respective cells is assumed to be constant, transmission power of a cell whose average reception level is relatively low is increased and transmission power of a cell whose average reception level is relatively high is decreased so as to equalize both average reception levels. Alternatively, transmission power of a cell whose average reception level is relatively low is increased or transmission power of a cell whose average reception level is relatively high is decreased so as to equalize both average reception levels. In the case shown in FIG. 3, total transmission power of cells #0 to #6 is assumed to be constant, transmission power corresponding to cell #1 is lowered and transmission power corresponding to cell #5 is raised. Alternatively, transmission power corresponding to cell #5 is raised or transmission power corresponding to cell #1 is lowered so as to equalize both average reception levels.

As another way of controlling transmission power, total transmission power of the respective cells may be assumed to be constant and transmission power corresponding to each mobile terminal apparatus may be corrected so as to equalize both average reception levels. That is, to increase transmission power corresponding to a mobile terminal apparatus to which CoMP is applied, transmission power corresponding to other mobile terminal apparatuses is borrowed. In this case, during scheduling, transmission power of other RBs (resource blocks) of an OFDM symbol is borrowed. In this case, transmission power may also be corrected by adjusting transmission power corresponding to all mobile terminal apparatuses in the cell or transmission power may also be corrected by lowering transmission power corresponding to mobile terminal apparatuses other than the mobile terminal apparatus located at the cell edge.

When an average reception level difference between radio base station apparatuses of CoMP candidate cells is large, transmission to the radio base station apparatus whose average reception level is relatively low is stopped (OFF) and only transmission from the radio base station apparatus of the highest average reception level is continued (Water filling) (method 2). Suppose this average reception level includes an average reception level (instantaneous reception level) in a shorter section than that of the average reception level over which the average reception level is compared with the first threshold.

Method 2 will be described using FIG. 3. Suppose average reception levels of signals from radio base station apparatuses of the respective cells at the mobile terminal apparatus are as shown in FIG. 3. In this case, an average reception level of each cell is determined against a threshold to determine whether or not the average reception level is within the threshold $\Delta_1$ first. When there is a cell whose average reception level is within the threshold $\Delta_1$, information indicating which cell corresponds to such a cell (cell information) is fed back to the radio base station apparatus. Here, since average reception levels of cell #1, cell #2 and cell #5 are within the threshold $\Delta_1$, information on cell #1, cell #2 and cell #5 is fed back to the radio base station apparatus.

When there is a cell whose average reception level is within the threshold $\Delta_1$ (first threshold), the radio base station apparatus determines that the mobile terminal apparatus is located at the cell edge. The procedure up to this determination is the same as that of handover. Next, the radio base station apparatus determines whether or not the average reception level difference is within the threshold $\Delta_2$ (second threshold). When the average reception level difference is within the threshold $\Delta_2$, joint transmission without matching the average reception levels is performed and when the average reception level difference exceeds the threshold $\Delta_2$, transmission from a radio base station apparatus of a cell whose average reception level is relatively low is switched OFF and only transmission from a radio base station apparatus of a cell whose average reception level is the highest is performed (DCS: Dynamic Cell Selection). In FIG. 3, when the average reception level difference is within the threshold $\Delta_2$ (cell #1, cell #5), joint transmission without matching the average reception levels is performed and when the average reception level difference exceeds the threshold $\Delta_2$ (cell #1, cell #2), only transmission from the radio base station apparatus of cell #1 is performed.

Furthermore, switching between method 1 and method 2 may be performed with a threshold determination (mode switching) (method 3).

Method 3 will be described using FIG. 3. Suppose average reception levels of signals from radio base station apparatuses in the respective cells at the mobile terminal apparatus are as shown in FIG. 3. In this case, an average reception level of each cell is determined against a threshold to determine whether or not there is any cell whose average reception level is within the threshold $\Delta_1$. When there is a cell whose average reception level is within the threshold $\Delta_1$, information indicating which cell corresponds to such a cell (cell information) is fed back to the radio base station apparatus. Here, since the average reception levels of cell #1, cell #2 and cell #5 are within the threshold $\Delta_1$, information on cell #1, cell #2 and cell #5 is fed back to the radio base station apparatus.

When there is a cell whose average reception level is within the threshold $\Delta_1$ (first threshold), the radio base station apparatus determines that the mobile terminal apparatus is located at the cell edge. The procedure up to this determination is the same as that of handover. Next, the radio base station apparatus determines whether or not the average reception level difference is within the threshold $\Delta_2$ (second threshold). When the average reception level difference is within the threshold $\Delta_2$, transmission power is controlled so as to equalize both average reception levels (joint transmission with matching the average reception levels). When the average reception level difference exceeds the threshold $\Delta_2$, transmission from a radio base station apparatus of a cell whose average reception level is relatively low is switched OFF and only transmission from a radio base station apparatus of a cell whose average reception level is the highest is performed (DCS). In FIG. 3, when the average reception level difference is within the threshold $\Delta_2$ (cell #1, cell #5), transmission power is controlled so as to equalize both average reception levels and when the average reception level difference exceeds the threshold $\Delta_2$ (cell #1, cell #2), only transmission from the radio base station apparatus of cell #1 is performed. Control over transmission power in this method 3 is the same as that of method 1.

Figure 4:
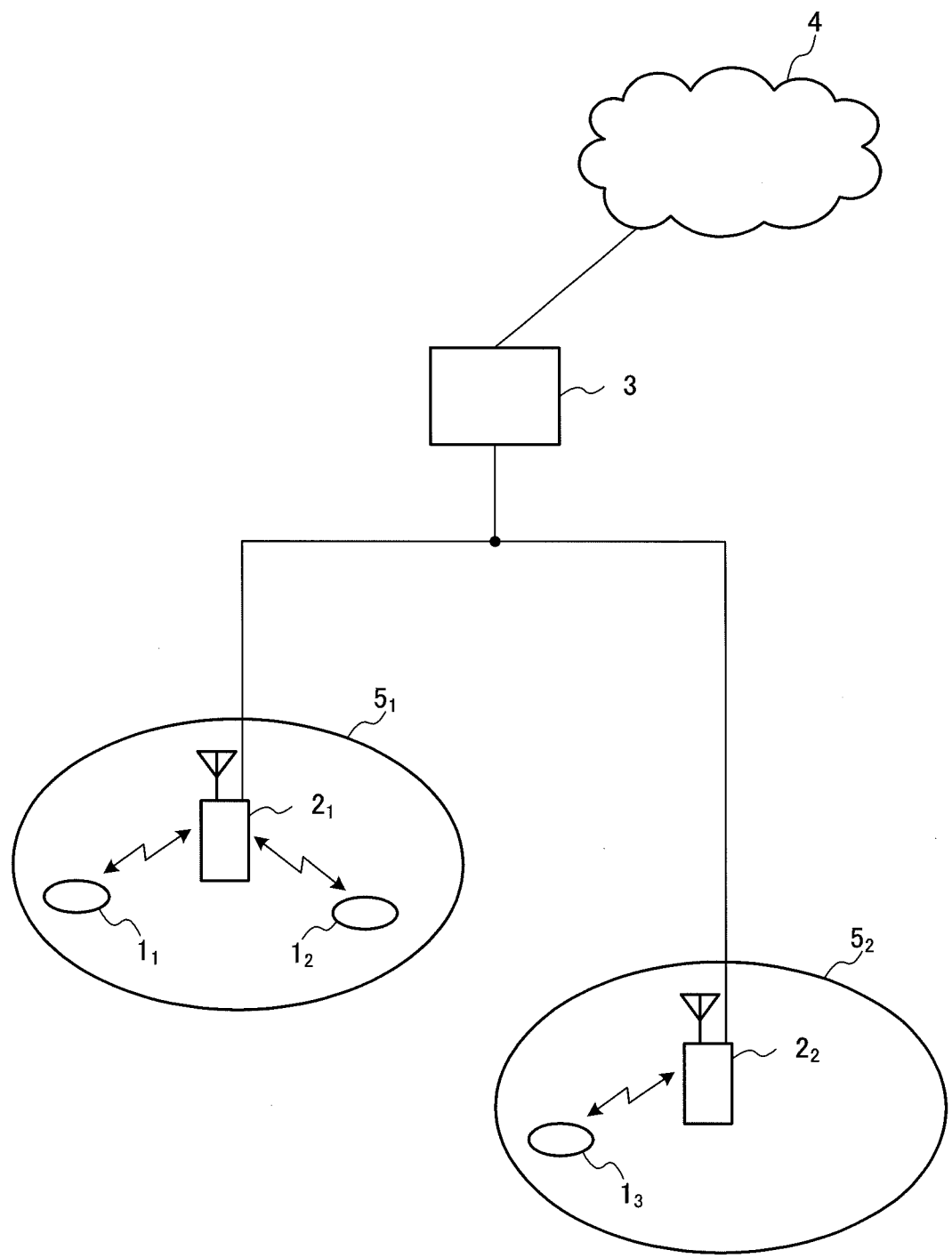
FIG. 4 is a diagram illustrating a radio communication system including radio base station apparatuses and mobile terminal apparatuses according to the embodiment of the present invention.

FIG. 4 is a diagram illustrating a radio communication system including mobile terminal apparatuses and radio base station apparatuses according to the embodiment of the present invention.

The radio communication system is a system to which, for example, E-UTRA (Evolved UTRA and UTRAN) is applied. The radio communication system is provided with radio base station apparatuses (eNB: eNode B) $2$ ($2_1$, $2_2$ ... $2_l$, l is an integer l>0) and a plurality of mobile terminal apparatuses (UE) $1_n$ ($1_1$, $1_2$, $1_3$, ... $1_n$, n is an integer n>0) that communicate with the radio base station apparatuses $2$. The radio base station apparatuses $2$ are connected to a higher-level station, for example, an access gateway apparatus $3$ and the access gateway apparatus $3$ is connected to a core network $4$. A mobile terminal apparatus $1_n$ communicates with the radio base station apparatus $2$ in a cell $5$ ($5_1$, $5_2$) using E-UTRA. The present embodiment shows a case with two cells, but the present invention is likewise applicable to three or more cells. Since the mobile terminal apparatuses ($1_1$, $1_2$, $1_3$, ... $1_n$) have identical configurations and functions, the mobile terminal apparatus will be described as a mobile terminal apparatus $1_n$ hereinafter unless specified otherwise.

The radio communication system applies OFDM (orthogonal frequency division multiplexing) to a downlink and applies SC-FDMA (single carrier-frequency division multiple access) to an uplink as radio access schemes. OFDM is a multicarrier transmission scheme that performs communication by dividing a frequency band into a plurality of narrower frequency bands (subcarriers) and mapping data to each subcarrier. SC-FDMA is a single carrier transmission scheme that divides a frequency band into portions for respective terminals so that a plurality of mobile terminal apparatuses use different frequency bands to reduce interference among mobile terminal apparatuses.

Here, a communication channel in E-UTRA will be described.

On a downlink, a physical downlink shared channel (PD-SCH: Physical Downlink Shared Channel) shared among mobile terminal apparatuses $1_n$ and a physical downlink control channel (PDCCH: Physical Downlink Control Channel) are used. The physical downlink control channel is also called "downlink L1/L2 control channel." User data, that is, a normal data signal is transmitted through the above physical downlink shared channel. Furthermore, downlink scheduling information (DL Scheduling Information), transmission acknowledgement information (ACK/NACK), uplink scheduling grant (UL Scheduling Grant), TPC command (Transmission Power Control Command) or the like are transmitted through the physical downlink control channel. The downlink scheduling information includes, for example, an ID of a user who communicates using the physical downlink shared channel, information of a transport format of the user data, that is, information on the data size, modulation scheme, retransmission control (HARQ: Hybrid ARQ) and downlink resource block allocation information or the like.

Furthermore, the uplink scheduling grant includes, for example, an ID of a user who communicates using the physical uplink shared channel, information of a transport format of the user data, that is, information on the data size, modulation scheme, uplink resource block allocation information, information on transmission power of the uplink shared channel or the like. Here, the uplink resource block corresponds to frequency resources and is also referred to as a "resource unit."

Furthermore, the transmission acknowledgement information (ACK/NACK) is transmission acknowledgement information on an uplink shared channel. The contents of the transmission acknowledgement information are expressed by either an acknowledgment response (ACK: Acknowledgement) that indicates that a transmission signal has been correctly received or a negative response (NACK: Negative Acknowledgement) that indicates that a transmission signal has not been correctly received.

For an uplink, a physical uplink shared channel (PUSCH: Physical Uplink Shared Channel) shared among mobile terminal apparatuses $1_n$ and a physical uplink control channel (PUCCH: Physical Uplink Control Channel) are used. User data, that is, normal data signal is transmitted through the above physical uplink shared channel. Furthermore, downlink channel quality information (CQI: Channel Quality Indicator) to be used for scheduling processing on the downlink shared physical channel and adaptive modulation/demodulation and coding processing (AMC: Adaptive Modulation and Coding scheme), and physical downlink shared channel transmission acknowledgement information are transmitted through the physical uplink control channel.

In addition to CQI or transmission acknowledgement information, the physical uplink control channel may also transmit a scheduling request for requesting resource allocation of the uplink shared channel or a release request in persistent scheduling or the like. Here, the resource allocation of the uplink shared channel means that the radio base station apparatus reports to the mobile terminal apparatus using a physical downlink control channel in a certain subframe that the mobile terminal apparatus may perform communication using an uplink shared channel in subsequent subframes.

Figure 5:
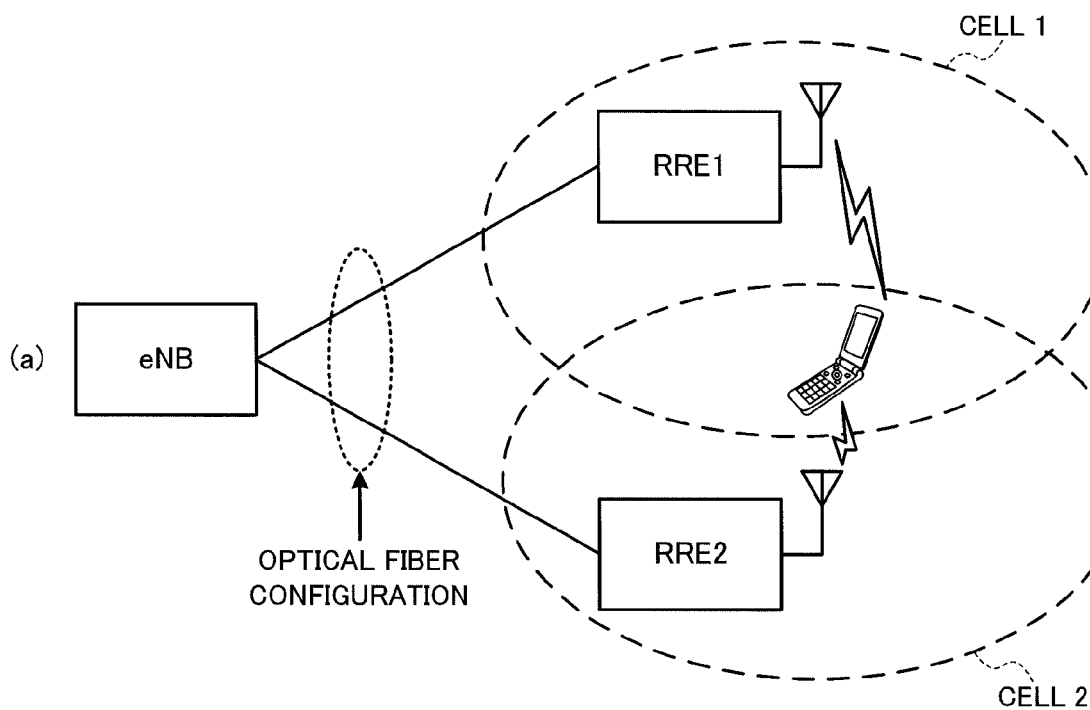
FIGS. 5(a) and (b) are diagrams illustrating a configuration of the radio communication system.
Figure 5:
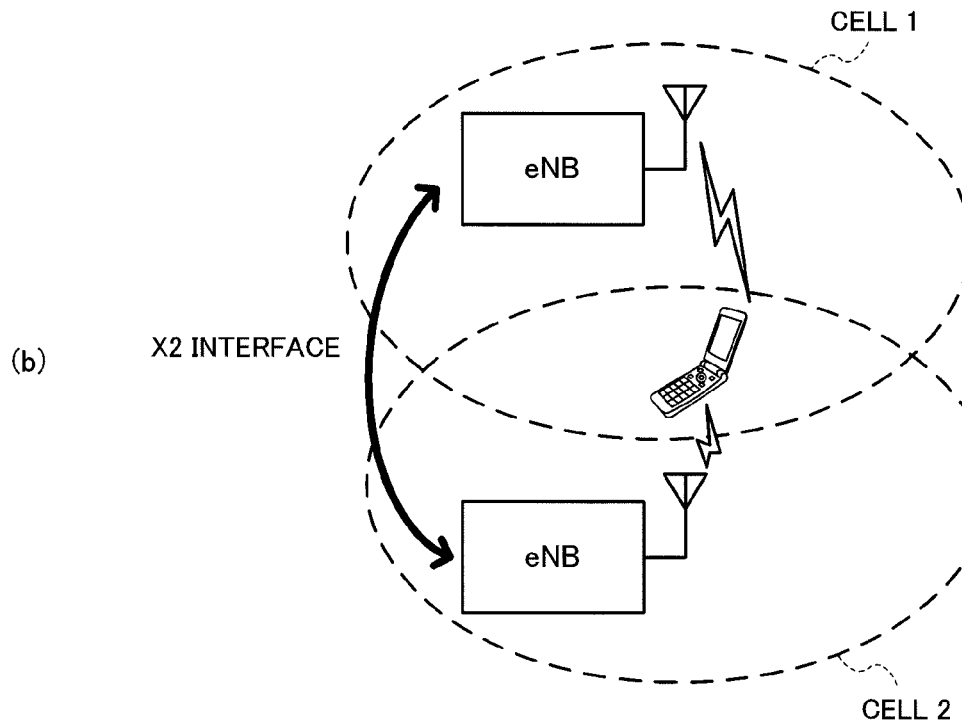

The configuration of the radio base station apparatus $2$ may be a configuration including a radio base station apparatus (eNB) and a plurality of remote radio apparatuses (RRE: Remote Radio Equipment) connected to this radio base station apparatus eNB in an optical fiber configuration as shown in FIG. 5(a) or may also be a radio base station apparatus (eNB) shown in FIG. 5(b). In the configuration shown in FIG. 5(a), the radio base station apparatus eNB controls remote radio apparatuses RRE1 and RRE2 in a concentrated manner, and therefore the radio base station apparatus eNB performs transmission power control using the above-described cell information and channel quality information. On the other hand, in the configuration shown in FIG. 5(b), via an X2 interface between a radio base station apparatus eNB of cell $1$ and a radio base station apparatus eNB of cell $2$, cell information and channel quality information are transmitted to any one radio base station apparatus, and that radio base station apparatus performs transmission power control.

Figure 6:
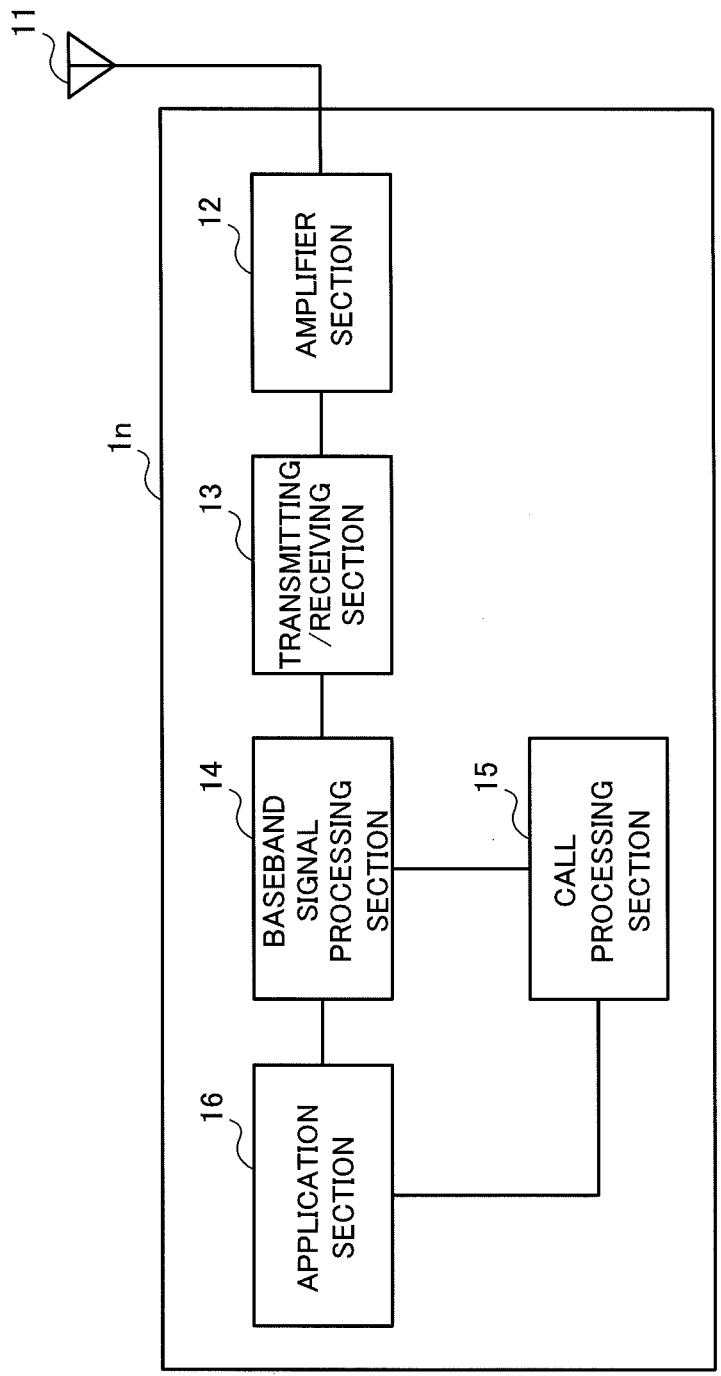
FIG. 6 is a block diagram illustrating a schematic configuration of the mobile terminal apparatus according to the embodiment of the present invention.

FIG. 6 is a block diagram showing a schematic configuration of the mobile terminal apparatus according to the embodiment of the present invention.

The mobile terminal apparatus $1_n$ shown in FIG. 6 is mainly constructed of an antenna $11$, an amplifier section $12$, a transmitting/receiving section $13$, a baseband signal processing section $14$, a call processing section $15$ and an application section $16$.

In the mobile terminal apparatus $1_n$ in such a configuration, regarding a downlink signal, a radio frequency signal received by the antenna $11$ is amplified by the amplifier section $12$ so that receiving power is corrected to predetermined power under AGC (Auto Gain Control). The amplified radio frequency signal is frequency-converted to a baseband signal by the transmitting/receiving section $13$. This baseband signal is subjected to a predetermined processing (error correction, decoding or the like) in the baseband signal processing section $14$, and then sent to the call processing section $15$ and application section $16$. The call processing section $15$ manages communication with the radio base station apparatus $2$ and the application section 16 performs processing on layers higher than the physical layer or MAC layer or the like. The mobile terminal apparatus $1_n$ of the present invention receives downlink signals including reference signals from a plurality of radio base station apparatuses associated with at least downlink CoMP.

Regarding an uplink signal, the application section inputs an uplink signal to the baseband signal processing section 14. The baseband signal processing section 14 performs retransmission control processing, scheduling, transmission format selection and channel coding or the like and transfers the signal to the transmitting/receiving section 13. The transmitting/receiving section 13 frequency-converts the baseband signal outputted from the baseband signal processing section 14 to a radio frequency signal. The frequency-converted signal is then amplified in the amplifier section 12 and transmitted from the antenna 11. The mobile terminal apparatus $1_n$ of the present invention respectively transmits feedback information including channel quality measurement results to a plurality of radio base station apparatuses.

Figure 7:
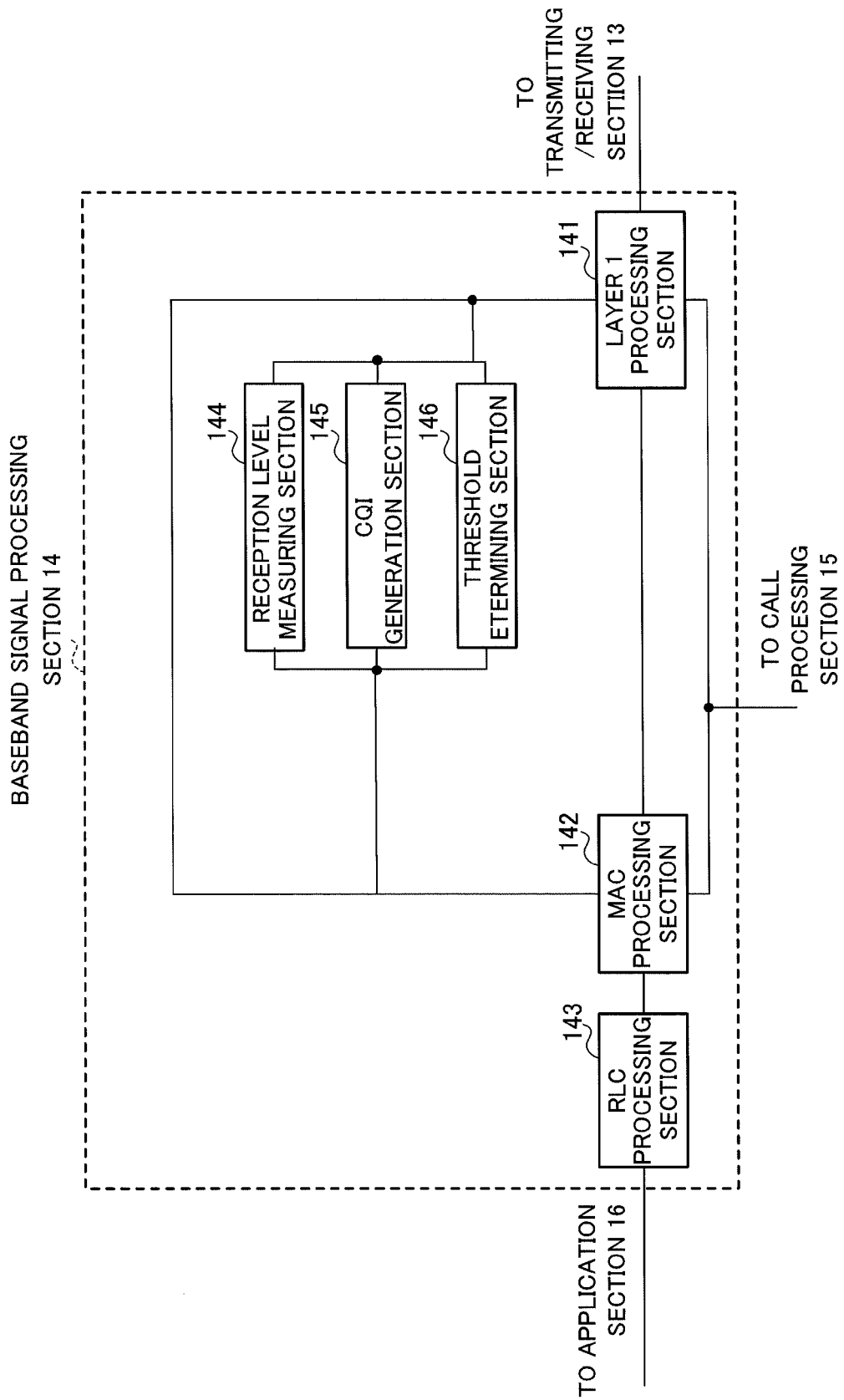
FIG. 7 is a block diagram illustrating a configuration of the baseband signal processing section of the mobile terminal apparatus shown in FIG. 6.

FIG. 7 is a block diagram showing a configuration of the baseband signal processing section in the mobile terminal apparatus shown in FIG. 6.

The baseband signal processing section 14 is mainly constructed of a layer 1 processing section 141, a MAC (Medium Access Control) processing section 142, an RLC (Radio Link Control) processing section 143, a reception level measuring section 144, a CQI generation section 145 and a threshold determining section 146.

The layer 1 processing section 141 mainly performs physical-layer-related processing. The layer 1 processing section 141 performs processing such as CP removal, Fast Fourier Transform (FFT), frequency demapping, Inverse Discrete Fourier Transform (IDFT) and data demodulation on a signal received on a downlink. Furthermore, the layer 1 processing section 141 performs processing such as data modulation, Discrete Fourier Transform (DFT), frequency mapping, Inverse Fast Fourier Transform (IFFT) and CP addition on a signal transmitted on an uplink.

The MAC processing section 142 performs retransmission control (HARQ) in a MAC layer on the signal received on the downlink and analysis of downlink scheduling information (identification of PDSCH transmission format, identification of PDSCH resource blocks). Furthermore, the MAC processing section 142 performs processing such as MAC retransmission control on the signal transmitted on the uplink, an analysis of uplink scheduling information (identification of PUSCH transmission format, identification of PUSCH resource block).

The RLC processing section 143 performs packet fragmentation, packet combining and retransmission control in an RLC layer or the like on a packet received on the downlink and/or a packet transmitted on the uplink.

The reception level measuring section 144 measures the reception level of the downlink signal from the radio base station apparatus of each peripheral cell. The measured reception level is subjected to a threshold determination by threshold determining section 146 as to whether or not the reception level is within a predetermined threshold range.

The CQI generation section 145 generates channel quality information (CQI) (measurement result) which is feedback information using a reference signal (CSI-RS) (or DM-RS) included in the downlink signal. That is, the CQI generation section 145 generates respective CQIs using CSI-RSs included in downlink signals from the radio base station apparatuses associated with at least downlink CoMP.

Since the mobile terminal apparatus receives CSI-RSs from a plurality of radio base station apparatuses, the present invention may orthogonalize CSI-RSs. However, when CSI-RSs are orthogonalized among cells, mobile terminal apparatuses that do not apply CoMP may measure channel quality not affected by cell interference. Therefore, mobile terminal apparatuses that do not perform CoMP reception may be subjected to control such as scheduling based on channel quality free of interference from other cells, although the mobile terminal apparatuses actually receive interference from other cells.

Actually CoMP is not applied to most mobile terminal apparatuses, and CSI-RSs are therefore basically preferably kept non-orthogonal among cells. When CSI-RSs are non-orthogonal among cells, mobile terminal apparatuses to which CoMP is applied measure channel quality affected by interference from other cells, and therefore, this channel quality needs to be estimated or corrected to channel quality not affected by interference from other cells. Therefore, the CQI generation section 145 generates a CQI using received CSI-RSs and corrects the CQI.

The following four methods can be cited as CQI correction methods:

1) Channel quality for selecting MCS (Modulation and Coding Scheme) is determined using terminal-specific (UE-specific) reference signal (method 1). As such reference signals, reference signals for demodulation (DM-RS) can be used. However, according to this method, since reference signals can be measured only when the reference signals are consecutively allocated to a certain user, switching is performed between a mode in which channel quality is measured using DM-RSs to select MCS and a mode in which channel quality is measured using CSI-RS to select MCS. Mode information indicating any one mode is reported from the radio base station apparatus. Therefore, the CQI generation section 145 measures channel quality to select MCS using DM-RS or CSI-RS according to the mode information and generates a CQI.

2) Channel quality to select MCS is measured using CSI-RS, receiving power of the cell of the other party to which CoMP is applied is measured, and the measured receiving power is subtracted from interference power and the measurement value (measurement result) is thereby corrected (method 2). Thus, according to the method 2, a CQI is measured in the presence of interference from the cell of the other party to which CoMP is applied and a correction is performed to obtain a CQI without interference.

3) Channel quality to select MCS is measured without interference from the cell of the other party to which CoMP is applied. In this case, channel quality to select MCS is measured using, for example, orthogonalized CSI-RS (method 3).

4) The radio base station apparatus determines the presence/absence of interference from the cell of the other party to which CoMP is applied and corrects the channel quality measurement result according to the determination result. Therefore, the radio base station apparatus corrects the channel quality measurement result when determining that there is interference from the cell of the other party to which CoMP is applied, and selects MCS using the channel quality measurement result from the mobile terminal apparatus when determining that there is no interference from the cell of the other party to which CoMP is applied.

When correcting the channel quality measurement result, the mobile terminal apparatus uses information of the receiving power ratio of each cell. The CQI generation section 145 corrects the channel quality measurement result using information of the receiving power ratio of each cell. The information of the receiving power ratio is fed back from the mobile terminal apparatus to the radio base station apparatus.

The threshold determining section 146 makes a threshold determination on the average reception level of each cell and determines whether or not there is a cell whose average reception level is within a threshold $\Delta_1$. When there is a cell whose average reception level is within the threshold $\Delta_1$, the information on the cell (cell information) is fed back to the radio base station apparatus.

Figure 8:
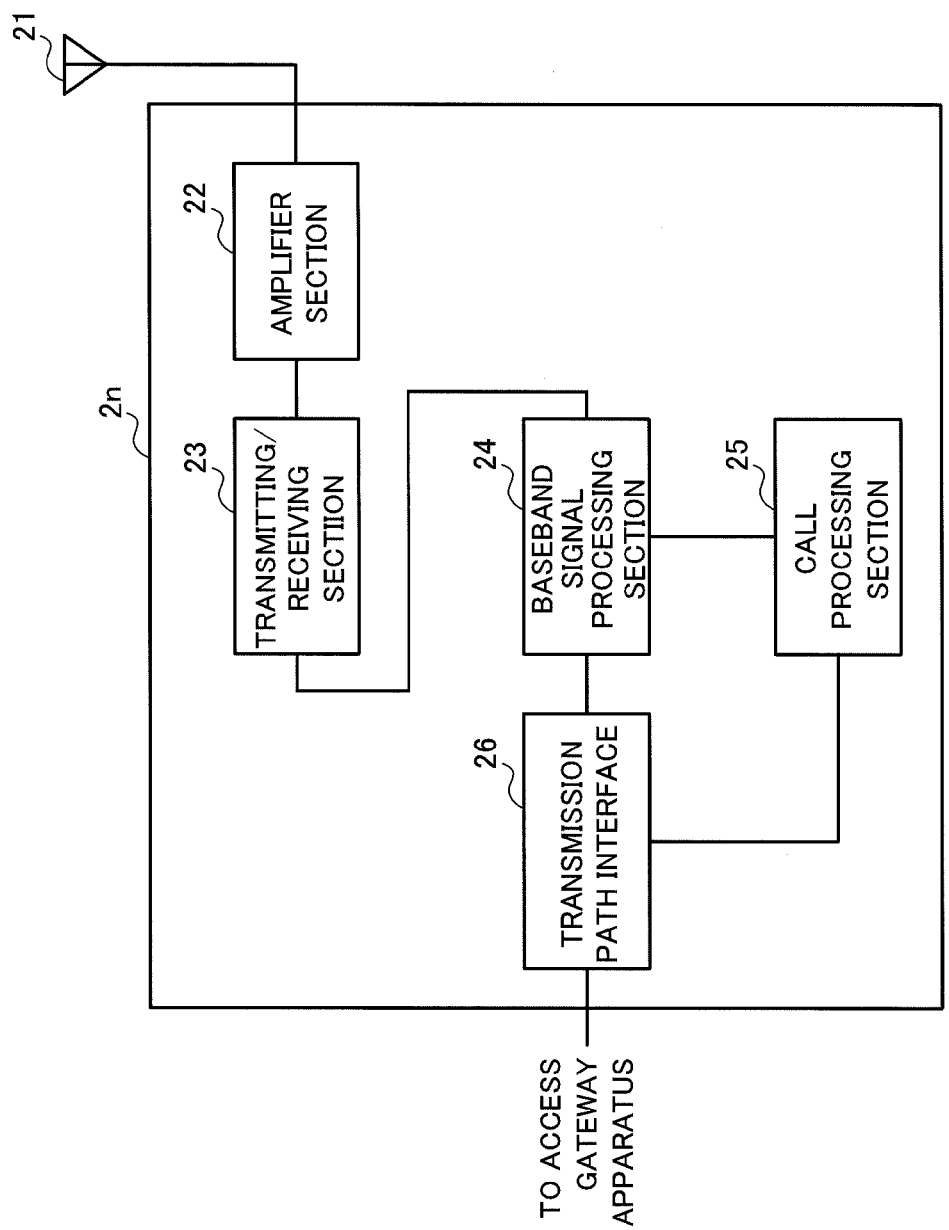
FIG. 8 is a block diagram illustrating a schematic configuration of the radio base station apparatus according to the embodiment of the present invention.

FIG. 8 is a block diagram illustrating a schematic configuration of the radio base station apparatus according to the embodiment of the present invention. The radio base station apparatus $2_n$ shown in FIG. 8 is mainly constructed of an antenna 21, an amplifier section 22, a transmission/reception section 23, a baseband signal processing section 24, a call processing section 25 and a transmission path interface 26.

In the radio base station apparatus $2_n$ in such a configuration, regarding an uplink signal, a radio frequency signal received by the antenna 21 is amplified by the amplifier section 22 so that receiving power is corrected to constant power under AGC. The amplified radio frequency signal is frequency-converted to a baseband signal by the transmission/reception section 23. This baseband signal is subjected to predetermined processing (error correction, decoding or the like) in the baseband signal processing section 24, then transferred to an access gateway apparatus (not shown) via the transmission path interface 26. The access gateway apparatus is connected to a core network and manages each mobile terminal apparatus. Furthermore, regarding an uplink, a reception SINR and an interference level of the radio frequency signal received by the radio base station apparatus 2 are measured based on the uplink baseband signal.

The call processing section 25 transmits/receives a call processing control signal to/from a radio control station which is a higher-level apparatus and performs state management or resource allocation on the radio base station apparatus 2. The processing in the above-described layer 1 processing section 241 and MAC processing section 242 is performed based on the communication state between the radio base station apparatus 2 and the mobile terminal apparatus 1 set in the call processing section 25.

The downlink signal is inputted from a higher-level apparatus to the baseband signal processing section 24 via the transmission path interface 26. The baseband signal processing section 24 performs retransmission control processing, scheduling, transmission format selection and channel coding or the like and transfers the signal to the transmission/reception section 23. The transmission/reception section 23 frequency-converts the baseband signal outputted from the baseband signal processing section 24 to a radio frequency signal. The frequency-converted signal is then amplified by the amplifier section 22 and transmitted from the antenna 21.

Figure 9:
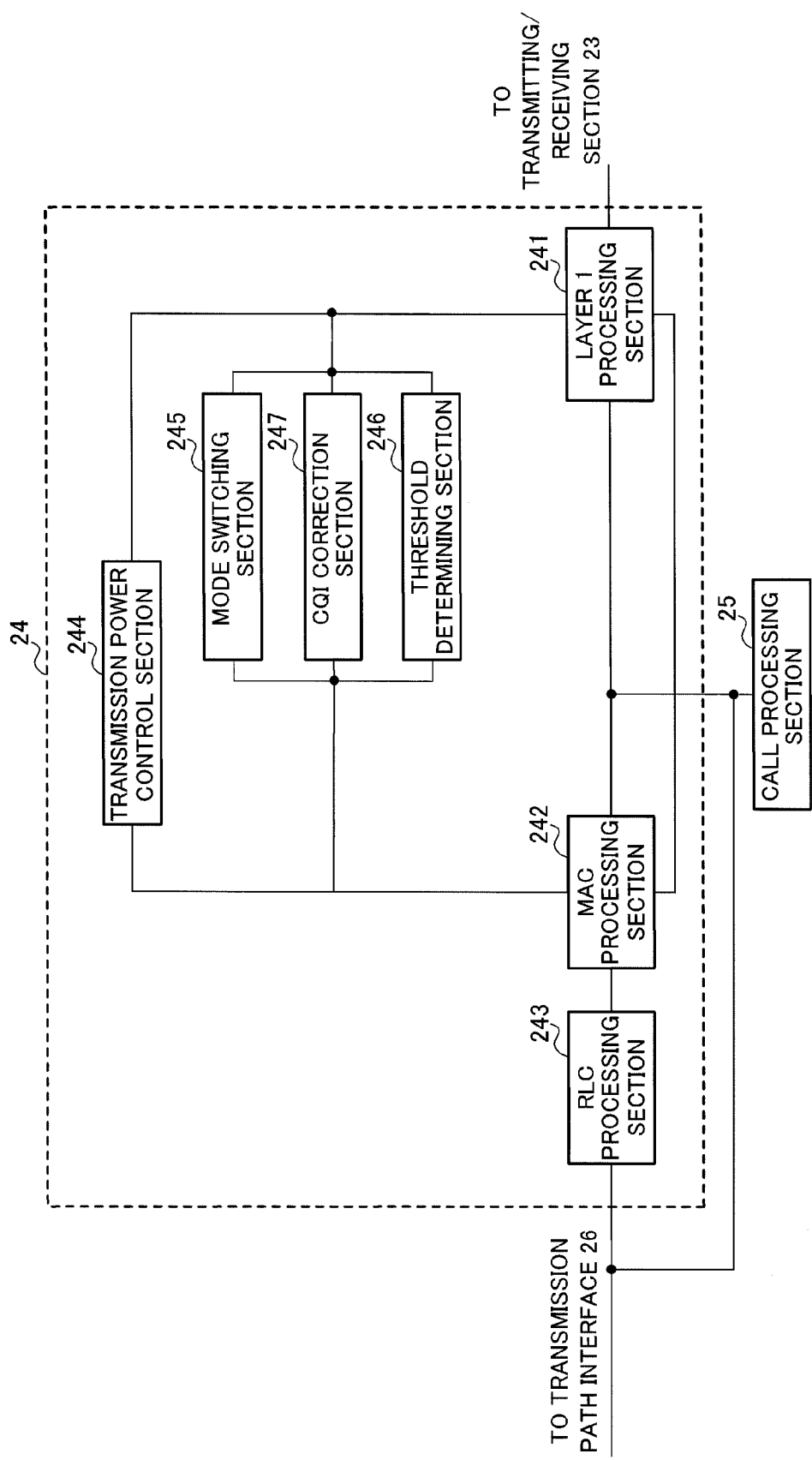
FIG. 9 is a block diagram illustrating a configuration of the baseband signal processing section in the radio base station apparatus shown in FIG. 8.

FIG. 9 is a block diagram showing a configuration of the baseband signal processing section in the radio base station apparatus shown in FIG. 8.

The baseband signal processing section 24 is mainly constructed of a layer 1 processing section 241, a MAC processing section 242, an RLC processing section 243, a transmission power control section 244, a mode switching section 245, a threshold determining section 246 and a CQI correction section 247.

The layer 1 processing section 241 mainly performs physical-layer-related processing. The layer 1 processing section 241 performs processing such as CP removal, Fast Fourier Transform (FFT), frequency demapping, Inverse Fast Fourier Transform (IFFT) and data demodulation on, for example, a signal received on an uplink. Furthermore, the layer 1 processing section 241 performs processing such as data modulation, Discrete Fourier Transform (DFT), frequency mapping, Inverse Fast Fourier Transform (IFFT) or CP addition on a signal transmitted on a downlink.

The MAC processing section 242 performs processing such as retransmission control in a MAC layer, scheduling on an uplink/downlink, selection of PUSCH/PDSCH transmission format and selection of PUSCH/PDSCH resource blocks on a signal received on an uplink.

The RLC processing section 243 performs packet fragmentation, packet combining, retransmission control in an RLC layer or the like on a packet received on an uplink/packet transmitted on a downlink.

The transmission power control section 244 controls transmission power of the mobile terminal apparatus, based on a determination result of the threshold determining section 246. The transmission power control section 244 controls transmission power of downlink transmission using fed back channel quality information (CQI) so as to equalize average reception levels of signals from radio base station apparatuses associated with CoMP transmission (radio base station apparatus of a CoMP candidate cell) at the mobile terminal apparatus (method 1). Furthermore, when an average reception level difference between radio base station apparatuses of CoMP candidate cells is large, the transmission power control section 244 performs control so as to stop (OFF) transmission to the radio base station apparatus of a relatively low average reception level and perform only transmission from a radio base station apparatus of the highest average reception level (method 2). Furthermore, the transmission power control section 244 performs transmission power control by switching between method 1 and method 2 based on the threshold determination result (method 3).

The mode switching section 245 switches the transmission mode based on the determination result of the threshold determining section 246, which will be described later. That is, the mode switching section 245 switches, based on the determination result of the threshold determining section 246, the modes as to whether performing control on transmission power from the CoMP target cell or performing only transmission from the cell whose average reception level is the highest at the mobile terminal apparatus.

The threshold determining section 246 determines whether or not the inter-cell average reception level difference sent from the mobile terminal apparatus as cell information whose average reception level is within the threshold $\Delta_1$ is within the threshold $\Delta_2$ (second threshold). The threshold determining section 246 outputs this determination result to the transmission power control section 244 and the mode switching section 245.

When the radio base station apparatus determines the presence/absence of interference from the cell of the other party to which CoMP is applied, the CQI correction section 247 corrects a CQI (channel quality measurement result) fed back from the mobile terminal apparatus according to the determination result. Therefore, when determining that there is interference from the cell of the other party to which CoMP is applied, the CQI correction section 247 corrects the CQI. In this case, the CQI is corrected using information on the receiving power ratio of each cell fed back from the mobile terminal apparatus. On the other hand, when determining that there is no interference from the cell of the other party to which CoMP is applied, the CQI correction section 247 selects MCS using the CQI fed back from the mobile terminal apparatus.

Next, the radio communication method between the mobile terminal apparatus and the radio base station apparatus configured as shown above will be described. Here, a case will be described where the radio base station apparatus has a configuration as shown in FIG. 5(a) including a radio base station apparatus eNB and a plurality of remote radio apparatuses RRE connected to the radio base station apparatus eNB via optical fibers extending therefrom.

The mobile terminal apparatus receives downlink signals including reference signals from a plurality of radio base station apparatuses (a plurality of remote radio apparatuses associated with downlink CoMP transmission). In the mobile terminal apparatus, the CQI generation section 145 generates a CQI using reference signals. When generating the CQI, the CQI may be generated using terminal-specific reference signals (e.g., DM-RSs) or the CQI may be generated using non-orthogonal CSI-RSs and then this CQI maybe corrected or the CQI maybe generated using orthogonalized CSI-RSs. The CQI is generated using DM-RSs according to the information regarding the mode in which the CQI is measured using DM-RSs.

Next, the mobile terminal apparatus transmits feedback information including the CQI to a plurality of remote radio apparatuses. In this case, the CQI may be transmitted to the plurality of remote radio apparatuses using PUCCH for every subframe on a time-division system or the CQI may be transmitted to the plurality of remote radio apparatuses through PUSCH or the CQI may be code-multiplexed and transmitted to the plurality of remote radio apparatuses or the CQI may be transmitted to the plurality of remote radio apparatuses from a plurality of transmitting antennas by MIMO transmission.

The radio base station apparatus receives an uplink signal. This uplink signal includes CQIs of a plurality of remote radio apparatuses associated with downlink CoMP transmission and cell information regarding remote radio apparatuses whose average reception levels are within the first threshold ($\Delta_1$) range. The radio base station apparatus determines, based on the CQI and cell information, whether or not there are remote radio apparatuses whose average reception level difference is within a second threshold ($\Delta_2$) range among remote radio apparatuses whose average reception levels are within the first threshold range and when there are remote radio apparatuses whose average reception level difference is within the second threshold range, the radio base station apparatus controls transmission power corresponding to both radio base station apparatuses using the CQI and cell information.

The CQI used for this transmission power control may also be a CQI corrected when the radio base station apparatus determines that there is interference from the cell of the other party to which CoMP is applied. For correction of the CQI in this case, information of the receiving power ratio of each cell fed back from the mobile terminal apparatus is used.

Regarding transmission power control, when the average reception level difference is within the threshold $\Delta_2$, transmission power is controlled so that both average reception levels are equal (method 1). Alternatively, when the average reception level difference is within the threshold $\Delta_2$, joint transmission without matching average reception levels is performed and when the average reception level difference exceeds the threshold $\Delta_2$, transmission from a radio base station apparatus of a cell whose average reception level is relatively low is switched OFF and only transmission from a radio base station apparatus of a cell whose average reception level is the highest is performed (DCS) (method 2). Alternatively, when the average reception level difference is within the threshold $\Delta_2$, transmission power is controlled so that both average reception levels become equal (joint transmission with matching the average reception levels) and when the average reception level difference exceeds the threshold $\Delta_2$, transmission from a radio base station apparatus of a cell whose average reception level is relatively low is switched OFF and only transmission from a radio base station apparatus of a cell whose average reception level is the highest is performed (DCS) (method 3). In the case of method 3, switching between method 1 and method 2 is performed, and therefore transmission power control is performed based on the mode information (mode of method 1 and mode of method 2).

Thus, the present invent ion measures channel quality using reference signals from a plurality of radio base station apparatuses and transmits feedback information including the respective channel quality measurement results to a plurality of radio base station apparatuses, and can thereby perform optimum control during downlink CoMP transmission in an LTE-A system.

A case has been described above where the radio base station apparatus has a configuration as shown in FIG. 5(a) including a radio base station apparatus eNB and a plurality of remote radio apparatuses RRE connected to the radio base station apparatus eNB via optical fibers extending therefrom, but the present invention is not limited to this, and may also adopt a configuration of radio base station apparatus (eNB) as shown in FIG. 5(b). In this case, information necessary for this transmission power control and CQI correction is transmitted using an X2 interface.

The present invention is not limited to the above embodiment, but can be implemented modified in various ways. In the above embodiment, the number of cells is an example and the present invention is not limited to this. Furthermore, the present invention can be implemented by changing the number of processing sections and the processing procedure as appropriate without departing from the scope of the present invention. Moreover, the respective elements shown in the figures represent functions and each function block may be implemented by hardware or by software. The present invention can also be implemented by modifying other elements as appropriate without departing from the scope of the present invention.

INDUSTRIAL APPLICABILITY

The present invention is suitable for use in a mobile terminal apparatus, radio base station apparatus and transmission power control method in an LTE-A system.

The present application is based on Japanese Patent Application No. 2010-002240 filed on Jan. 7, 2010, entire content of which is expressly incorporated by reference herein.

The invention claimed is:

1. A radio communication system comprising: radio base station apparatuses; and a mobile terminal apparatus,
the mobile terminal apparatus comprising:
a receiving section configured to receive downlink signals including reference signals from a plurality of radio base station apparatuses associated with downlink multipoint transmission;
a channel quality measuring section configured to measure channel qualities using the reference signals; and
a transmitting section configured to transmit feedback information including the channel quality measurement results to the plurality of radio base station apparatuses,
each of the radio base station apparatuses comprising:
a receiving section configured to receive uplink signals including channel quality measurement results of a plurality of radio base station apparatuses associated with downlink multipoint transmission and cell information on radio base station apparatuses whose average reception levels are within a first threshold range;

a determining section configured to determine whether or not there are radio base station apparatuses whose average reception level difference is within a second threshold range among radio base station apparatuses whose average reception levels are within the first threshold range from the channel quality measurement result and the cell information; and a transmission power control section configured to control, when there are radio base station apparatuses whose average reception level difference is within the second threshold range, transmission power of at least one of the radio base station apparatuses so that the average reception levels from the radio base station apparatuses become substantially equal.

2. The radio communication system according to claim 1, wherein the transmitting section time-division multiplexes and transmits the feedback information to the plurality of radio base station apparatuses.

3. The radio communication system according to claim 1, wherein the transmitting section code-multiplexes and transmits the feedback information to the plurality of radio base station apparatuses.

4. The radio communication system according to claim 1, wherein the transmitting section MIMO-transmits the feedback information from a plurality of transmitting antennas to the plurality of radio base station apparatuses.

5. The radio communication system according to claim 1, wherein the channel quality measurement results are calculated using terminal-specific reference signals.

6. The radio communication system according to claim 1, wherein the channel quality measurement results are measured using reference signals for measuring channel qualities and obtained by correcting the measurement results.

7. The radio communication system according to claim 1, wherein the channel quality measurement results are obtained using orthogonalized reference signals for measuring channel qualities.

8. The radio communication system according to claim 6, wherein the mobile terminal apparatus corrects the measurement results using information on a ratio of receiving power from each radio base station apparatus.

9. A radio base station apparatus comprising:

a receiving section configured to receive uplink signals including channel quality measurement results of a plurality of radio base station apparatuses associated with downlink multipoint transmission and cell information on radio base station apparatuses whose average reception levels are within a first threshold range;

a determining section configured to determine whether or not there are radio base station apparatuses whose average reception level difference is within a second threshold range among radio base station apparatuses whose average reception levels are within the first threshold range from the channel quality measurement result and the cell information; and a transmission power control section configured to control, when there are radio base station apparatuses whose average reception level difference is within the second threshold range, transmission power of at least one of the radio base station apparatuses so that the average reception levels from the radio base station apparatuses become substantially equal.

10. The radio base station apparatus according to claim 9, wherein when there are no radio base station apparatuses whose average reception level difference is within the second threshold range, only transmission from a radio base station apparatus with the highest average reception level is performed.

11. The radio base station apparatus according to claim 9, wherein the transmission power control section is configured to correct the transmission power by adjusting transmission power for all mobile terminal apparatuses.

12. The radio base station apparatus according to claim 9, wherein the transmission power control section is configured to correct the transmission power by lowering transmission power for mobile terminal apparatuses other than a mobile terminal apparatus at a cell edge.

13. The radio base station apparatus according to claim 9, further comprising a channel quality measurement result correction section configured to correct the channel quality measurement results using information on a ratio of receiving power from each radio base station apparatus, the ratio being fed back from a mobile terminal apparatus.

14. The radio base station apparatus according to claim 9, wherein the plurality of radio base station apparatuses comprises a radio base station apparatus and a plurality of remote radio apparatuses connected to the radio base station apparatus in an optical fiber configuration.

15. A radio communication method comprising:

steps of a mobile terminal apparatus receiving downlink signals including reference signals from a plurality of radio base station apparatuses associated with downlink multipoint transmission;

measuring channel qualities using the reference signals; and transmitting feedback information including channel quality measurement results to the plurality of radio base station apparatuses, and steps of a radio base station apparatus receiving uplink signals including the channel quality measurement results of the plurality of radio base station apparatuses associated with downlink multipoint transmission and cell information on radio base station apparatuses whose average reception levels are within a first threshold range;

determining whether or not there are radio base station apparatuses whose average reception level difference is within a second threshold range among the radio base station apparatuses whose average reception levels are within the first threshold range from the channel quality measurement results and the cell information; and controlling, when there are radio base station apparatuses whose average reception level difference is within the second threshold range, transmission power of at least one of the radio base station apparatuses so that the average reception levels from the radio base station apparatuses become substantially equal.

* * * * *